(12) United States Patent
Mitsuma

(10) Patent No.: US 12,233,584 B2
(45) Date of Patent: Feb. 25, 2025

(54) INJECTION MOLDING MACHINE MANAGEMENT SYSTEM

(71) Applicant: SEIKO EPSON CORPORATION, Tokyo (JP)

(72) Inventor: Yusuke Mitsuma, Shiojiri (JP)

(73) Assignee: SEIKO EPSON CORPORATION (JP)

( * ) Notice: Subject to any disclaimer, the term of this patent is extended or adjusted under 35 U.S.C. 154(b) by 39 days.

(21) Appl. No.: 18/087,096

(22) Filed: Dec. 22, 2022

(65) Prior Publication Data
US 2023/0202087 A1    Jun. 29, 2023

(30) Foreign Application Priority Data

Dec. 24, 2021 (JP) ................. 2021-210102

(51) Int. Cl.
*B29C 45/76*    (2006.01)
*B29C 33/70*    (2006.01)

(52) U.S. Cl.
CPC ............ *B29C 45/768* (2013.01); *B29C 33/70* (2013.01); *B29C 2045/7606* (2013.01); *B29C 2945/7604* (2013.01); *B29C 2945/76066* (2013.01); *B29C 2945/7614* (2013.01); *B29C 2945/7618* (2013.01); *B29C 2945/76264* (2013.01)

(58) Field of Classification Search
CPC ............ B29C 2045/7606; B29C 33/70; B29C 45/7686; B29C 2945/7629; B29C 45/768
See application file for complete search history.

(56) References Cited

U.S. PATENT DOCUMENTS

| 2004/0148136 A1* | 7/2004 | Sasaki | ............. G05B 19/4065 |
| | | | 702/184 |
| 2022/0138702 A1* | 5/2022 | Kawagoe | ............ B29C 45/1774 |
| | | | 705/305 |

FOREIGN PATENT DOCUMENTS

| EP | 3315281 A1 * | 5/2018 | ............ B07C 5/34 |
| JP | H1158479 A * | 3/1999 | |
| JP | 2003-094487 A | 4/2003 | |

(Continued)

OTHER PUBLICATIONS

Translation of JP-H1158479-A (Year: 1999).*
Translation of KR-101183446-B1 (Year: 2012).*
Translation of WO-2023007655-A1 (Year: 2023).*

*Primary Examiner* — John J DeRusso
(74) *Attorney, Agent, or Firm* — Harness, Dickey & Pierce, P.L.C.

(57) ABSTRACT

An injection molding machine management system includes an injection molding machine, a take-out robot, an inspection device, a memory, and a processor. The processor is configured to receive physical information of the injection molding machine and a mold, and an inspection result of a molded product. The received physical information includes an identification information of the mold and the injection molding machine, a shot number of injection molding with respect to the mold, an injection filling time with respect to the mold, an injection pressure, a mold clamping force, and a set temperature of each part of the injection molding machine. The received physical information and the inspection result are displayed on a display. Necessity of maintenance is notified to an operator based on a predetermined maintenance period of time, the received physical information, and/or the inspection result.

7 Claims, 2 Drawing Sheets

(56) References Cited

FOREIGN PATENT DOCUMENTS

KR 101183446 B1 * 9/2012
WO WO-2023007655 A1 * 2/2023

* cited by examiner

INJECTION MOLDING MACHINE MANAGEMENT SYSTEM

The present application is based on, and claims priority from JP Application Serial Number 2021-210102, filed Dec. 24, 2021, the disclosure of which is hereby incorporated by reference herein in its entirety.

BACKGROUND

1. Technical Field

The present disclosure relates to an injection molding machine management system.

2. Related Art

JP-A-2003-94487 discloses a management system for managing a metal mold of an injection molding machine, in which when a total number of shots of the metal mold reaches the number of maintenance shots that is the number of shots up to which maintenance is to be performed, an alarm showing that fact is displayed.

In JP-A-2003-94487, it is not sufficiently studied to appropriately determine a timing of maintenance of a molding mold when the molding mold is repeatedly used while maintaining the molding mold. A timing at which next maintenance of the molding mold is to be performed is usually advanced due to long-term use, and varies depending on a condition of injection molding and the like. Therefore, there has been a demand for a technique for appropriately determining a timing of the maintenance of the molding mold.

SUMMARY

According to an aspect of the present disclosure, an injection molding machine management system that manages an injection molding machine configured to mold a molded product by injection molding is provided. The injection molding machine management system includes: a physical quantity acquisition unit configured to acquire physical quantity information including at least any one of a first physical quantity representing a physical quantity related to the injection molding of the injection molding machine, a second physical quantity representing a physical quantity related to the injection molding of a molding mold mounted on the injection molding machine, and a third physical quantity representing a physical quantity related to quality of the molded product; a storage unit configured to store a cumulative number of shots of the molding mold in a predetermined maintenance period and the physical quantity information in time series; and a display unit configured to display a display screen on which the cumulative number of shots and a physical quantity included in the physical quantity information are displayed in the same time series, and the maintenance period is a period from a first time point that is a time point at which the molding mold is maintained to a second time point that is a time point at which the molding mold is maintained after the first time point.

DESCRIPTION OF EXEMPLARY EMBODIMENTS

A. First Embodiment

Figure 1:
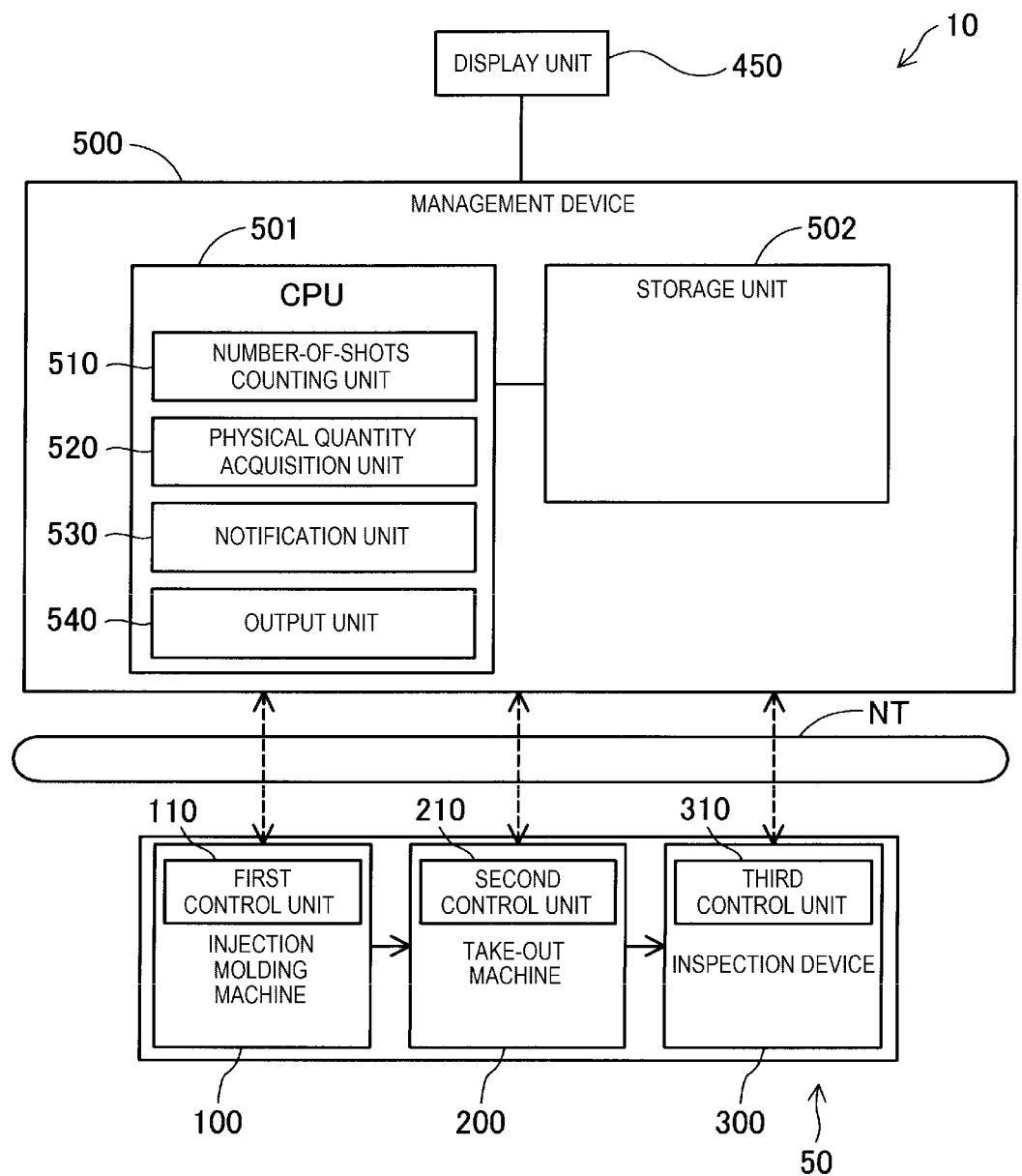
FIG. 1 is a diagram illustrating a schematic configuration of an injection molding machine management system.

FIG. 1 is a diagram illustrating a schematic configuration of an injection molding machine management system 10 according to a first embodiment. The injection molding machine management system 10 manages an injection molding machine 100. The injection molding machine management system 10 according to the present embodiment includes a display unit 450 and a management device 500.

In the present embodiment, the injection molding machine 100 is provided in an injection molding unit 50. The injection molding unit 50 includes a take-out machine 200 and an inspection device 300 in addition to the injection molding machine 100.

In FIG. 1, a flow of a molded product manufactured by the injection molding unit 50 is indicated by solid line arrows. In the injection molding unit 50, a molded product is molded by the injection molding machine 100, the molded product is taken out from the injection molding machine 100 by the take-out machine 200 and conveyed to the inspection device 300, and the molded product is inspected by the inspection device 300.

The injection molding machine 100 includes a first control unit 110, and a material storage part, a plasticizing device, an injection device, and a mold clamping device, which are not shown. A molding mold having a cavity is mounted on the mold clamping device. The molding mold may be made of metal, ceramic, or resin. A molding mold made of metal is referred to as a metal mold.

The first control unit 110 is configured with a computer including one or a plurality of processors, a storage device, and an input and output interface for performing signal input and output with respect to an outside. The first control unit 110 may be configured with a plurality of computers. A second control unit 210 of the take-out machine 200 and a third control unit 310 of the inspection device 300 described later have configurations similar to that of the first control unit 110.

The first control unit 110 controls units of the injection molding machine 100 to perform injection molding and mold a molded product. More specifically, the first control unit 110 controls the mold clamping device to clamp the molding mold mounted on the injection molding machine 100, controls the plasticizing device to plasticize a material supplied from the material storage part, and controls the injection device to inject the plasticized material into the molding mold by an injection plunger or the like. Accordingly, the first control unit 110 molds a molded product having a shape corresponding to a shape of the cavity provided in the molding mold. The plasticizing device and the injection device may be integrated. For example, the injection molding machine 100 may be configured to plasticize and inject a material by an in-line screw.

In the material storage part, for example, a resin material such as ABS formed in a pellet shape is stored as a material for molding a molded product in the injection molding machine 100. The material storage part according to the present embodiment is configured with a hopper, and is coupled to the plasticizing device.

The first control unit 110 transmits physical quantity data representing a physical quantity related to the injection molding to the management device 500. The physical quantity data includes measurement data related to the injection molding and various command values related to the injection molding. The command value is a value set for the injection molding machine 100, for example, an injection filling time, an injection pressure, a mold-clamping force, and a set temperature of each part. The measurement data is data measured by various sensors provided in the injection molding machine 100 and the molding mold. The measurement data includes, for example, a physical quantity of each part of the injection molding machine 100 and a physical quantity of the molding mold related to the injection molding, in addition to data obtained by measuring an actual value with respect to a value set by the command value. The measurement data is associated with a time point at which measurement is performed, and the command value is associated with a time point at which a command is executed. Further, the measurement data and the command value are associated with identification information of the molding mold mounted on the injection molding machine 100 and identification information of the injection molding machine 100 itself.

Each time the injection molding is performed once in the injection molding machine 100, the first control unit 110 according to the present embodiment transmits a shot number to the management device 500. Hereinafter, one injection molding may be referred to as one shot. In the present embodiment, the shot number is associated with a time point at which a shot is executed and identification information of the molding mold used for the shot. Hereinafter, the shot number, the time point of the shot, and the identification information of the molding mold used for the shot may be collectively referred to as shot information.

The take-out machine 200 according to the present embodiment is configured with the second control unit 210, a take-out robot, and a cutting machine. The second control unit 210 controls operations of the take-out robot and the cutting machine. The take-out robot is, for example, a horizontal articulated robot or a perpendicular articulated robot. The take-out robot takes out a molded product from the molding mold of the injection molding machine 100. The cutting machine is a device that removes a sprue and a runner, which are molded together with a molded product by the molding mold, from the molded product by cutting. In the present embodiment, the take-out robot grasps and takes out a molded product released from the molding mold by an ejector mechanism of the injection molding machine 100 by an end effector attached to a tip end of an arm of the take-out robot. Thereafter, the sprue and the runner are removed from the molded product by the cutting machine, and the molded product from which the sprue and the runner are removed is conveyed to the inspection device 300 by the take-out robot. In another embodiment, the take-out robot may be, for example, a robot that grasps a molded product by vacuum suction. The take-out machine 200 may not include the cutting machine.

The inspection device 300 according to the present embodiment is configured with the third control unit 310, a camera, and a weight scale. The third control unit 310 performs an appearance inspection and a dimension inspection of a molded product by controlling the camera to capture an image of the molded product, and analyzing the captured image of the molded product. Further, the third control unit 310 measures a weight of a molded product by the weight scale.

The third control unit 310 transmits, to the management device 500, inspection result data indicating information on an inspection result of a molded product molded by the injection molding machine 100. The inspection result data includes a dimension of a molded product measured using the camera, a quality determination result, a type of a defect, and a weight of the molded product measured by the weight scale. The inspection result data is associated with time points at which inspections are performed.

The display unit 450 according to the present embodiment is configured with a liquid crystal display provided in the management device 500. Various pieces of information output from the management device 500 are displayed on the display unit 450. For example, a touch panel function may be provided in the display unit 450. Further, in another embodiment, the display unit 450 may not be provided in the management device 500. For example, the display unit 450 may be a display of a device such as a computer, a tablet terminal, or a smartphone separated from the management device 500.

The management device 500 is configured with a computer including a CPU 501 and a storage unit 502. The storage unit 502 includes a main storage device and an auxiliary storage device.

The management device 500 is configured to communicate with the injection molding unit 50. More specifically, in the present embodiment, the management device 500 is communicably connected to the injection molding machine 100, the take-out machine 200, and the inspection device 300 provided in the injection molding unit 50. In the present embodiment, the management device 500 is configured to communicate, via a network NT, with the injection molding machine 100, the take-out machine 200, and the inspection device 300. The network NT may be, for example, a LAN, a WAN, or the Internet. The management device 500 transmits and receives data to and from the injection molding machine 100, the take-out machine 200, and the inspection device 300 by communicating, via the network NT, with the injection molding machine 100, the take-out machine 200, and the inspection device 300.

The management device 500 includes a number-of-shots counting unit 510, a physical quantity acquisition unit 520, a notification unit 530, and an output unit 540. The number-of-shots counting unit 510, the physical quantity acquisition unit 520, the notification unit 530, and the output unit 540 are implemented by the CPU 501 executing a program stored in the storage unit 502. These units may be implemented by a circuit.

The number-of-shots counting unit 510 counts a cumulative number of shots for the molding mold in a predetermined maintenance period, and causes the storage unit 502 to store the cumulative number of shots in time series. The maintenance period refers to a period from a first time point to a second time point. Both the first time point and the second time point represent maintenance time points that are time points at which the molding mold is maintained. The second time point is a maintenance time point after the first time point. In the present embodiment, the second time point is a time point which is next to the first time point and at which the molding mold is maintained. That is, in the present embodiment, there is no other maintenance time point between the first time point and the second time point.

Maintenance of the molding mold is executed for repeatedly using the molding mold while eliminating defects caused by long-term use of the molding mold, such as damage to the cavity, clogging of a gas vent communicating with the cavity, wear of a parting surface, clogging of various pipes provided in the molding mold, damage of wiring provided in the molding mold, and wear and operation failure of a movable part provided in the molding mold. The maintenance executed in the present embodiment is comprehensive maintenance of the molding mold, such as cleaning performed by disassembling the molding mold or replacement of components, and is a so-called overhaul. A sign of the defect of the molding mold due to long-term use may appear as, for example, a difference in measurement data of the molding mold acquired by various sensors, and may also appear as a difference in measurement data of each part of the injection molding machine 100 acquired by various sensors. Further, the sign of the defect of the molding mold due to the long-term use may appear as a difference in inspection result data when a difference in quality of the molded product appears. Further, for example, when the injection filling time or the injection pressure is changed to prevent shortage of a material caused by clogging of the gas vent or the like, the sign of the defect of the molding mold due to the long-term use may appear as a difference in a command value of the injection molding machine 100.

Based on information on a maintenance time point and shot information transmitted from the first control unit 110, the number-of-shots counting unit 510 according to the present embodiment cumulates and counts the number of shots of the molding mold at each maintenance time point. The information on the maintenance time point is input to the management device 500 by a user via an input device such as a mouse or a keyboard (not shown), for example, when maintenance is started, or after the maintenance is completed and before the molding mold is used to execute the injection molding. In another embodiment, the information on the maintenance time point may be input to, for example, the injection molding machine 100. In this case, the first control unit 110 may transmit the information on the maintenance time point to the management device 500. The information on the maintenance time point may be any information as long as it represents a timing at which the molding mold is maintained, and for example, may be represented by date and time or the like at which maintenance is performed, or may be represented by a shot number when the maintenance is performed.

More specifically, the number-of-shots counting unit 510 first counts the number of shots of the molding mold from 1 until next maintenance information is input after maintenance information is input. Thereafter, when the next maintenance information is input, the number-of-shots counting unit 510 counts the number of shots of the molding mold from 1 again. Thereafter, the number-of-shots counting unit 510 repeats similar processing. Each counted number of shots is associated with a time point of a shot. The number-of-shots counting unit 510 causes the storage unit 502 to store, as a cumulative number of shots, the number of shots counted in this way in time series.

The physical quantity acquisition unit 520 acquires physical quantity information. The physical quantity information refers to information including at least any one of a first physical quantity, a second physical quantity, and a third physical quantity. The first physical quantity represents a physical quantity related to injection molding in the injection molding machine 100. The second physical quantity represents a physical quantity related to injection molding in the molding mold. The third physical quantity represents a physical quantity related to quality of the molded product. In the present embodiment, the physical quantity information includes all of the first physical quantity, the second physical quantity, and the third physical quantity. The physical quantity acquisition unit 520 according to the present embodiment acquires the first physical quantity and the second physical quantity by acquiring a command value and measurement data transmitted from the first control unit 110. Further, the physical quantity acquisition unit 520 acquires the third physical quantity information by acquiring inspection data transmitted from the third control unit 310. The physical quantity acquisition unit 520 causes the storage unit 502 to store the physical quantities included in the acquired physical quantity information in time series.

The first physical quantity according to the present embodiment includes at least any one of a physical quantity related to the material storage part, a physical quantity related to the plasticizing device, a physical quantity related to the injection device, and a physical quantity related to the mold clamping device. The second physical quantity according to the present embodiment includes at least any one of a physical quantity related to the cavity, a physical quantity related to the movable part provided in the molding mold, and a physical quantity related to a temperature adjustment part provided in the molding mold. Details of physical quantities included in each of the first physical quantity, the second physical quantity, and the third physical quantity will be described later.

In the present embodiment, the physical quantity acquisition unit 520 acquires environmental information including at least any one of an environmental temperature and an environmental humidity of the injection molding machine 100 in addition to the physical quantity information. The physical quantity acquisition unit 520 acquires, for example, as the environmental temperature and the environmental humidity, a temperature and a humidity measured by a temperature sensor and a humidity sensor (not shown) provided in the injection molding machine 100. The physical quantity acquisition unit 520 causes the storage unit 502 to store, in time series, the acquired environmental temperature and the acquired environmental humidity in association with time points at which the environmental temperature and the environmental humidity are measured.

The output unit 540 generates display data including data for displaying, in the same time series, the cumulative number of shots and the physical quantities included in the physical quantity information. The display data includes data for drawing a cumulative number of shots display region, a physical quantity information display region, and an environmental information display region described later. The output unit 540 transmits the generated display data to the display unit 450. The display unit 450 displays a display screen according to the display data transmitted from the output unit 540.

When a physical quantity included in current physical quantity information is out of a predetermined range, the notification unit 530 notifies the maintenance information that is the information on the maintenance of the molding mold. In the present embodiment, the notification unit 530 notifies the maintenance information by displaying, as the maintenance information, a dialog prompting the maintenance of the molding mold on the display unit 450. The range of the physical quantity may be determined based on, for example, an upper limit value and a lower limit value of a management limit of each physical quantity, or may be determined based on an upper limit standard value and a lower limit standard value. Accordingly, when a current physical quantity is out of a range of the management limit or the standard value, the notification unit 530 can notify the maintenance information. In another embodiment, for example, the notification unit 530 may not notify the maintenance information as visual information. For example, the notification unit 530 may notify, via a speaker (not shown), the maintenance information as voice information.

Figure 2:
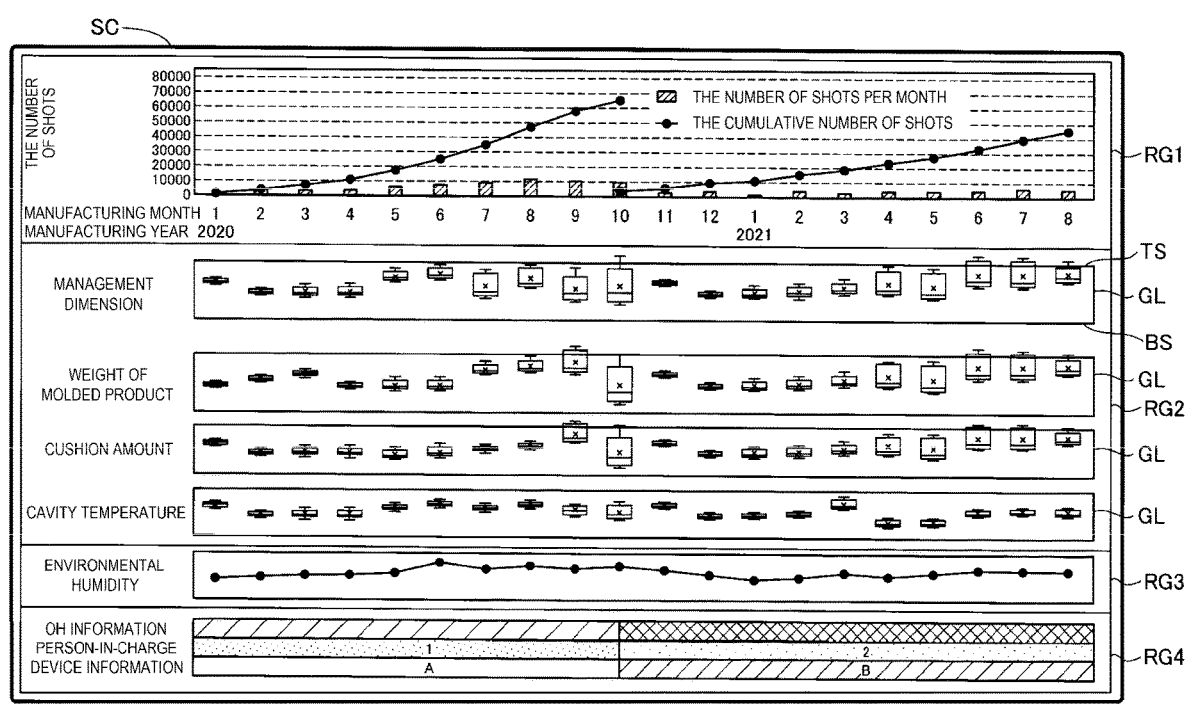
FIG. 2 is a diagram illustrating an example of a display screen displayed on a display unit.

FIG. 2 is a diagram illustrating an example of a display screen SC displayed on the display unit 450. In the present embodiment, a cumulative number of shots display region RG1, a physical quantity information display region RG2, an environmental information display region RG3, and a manufacturing condition display region RG4 are provided on the display screen SC in this order from the top. However, the order of these displays is freely set. Further, the display order of these display regions may be interchanged by a predetermined operation such as drag-and-drop. An axis of each display region in a lateral direction is a time axis. The cumulative number of shots display region RG1, the physical quantity information display region RG2, the environmental information display region RG3, and the manufacturing condition display region RG4 have a common time axis. That is, pieces of information displayed in the cumulative number of shots display region RG1, the physical quantity information display region RG2, the environmental information display region RG3, and the manufacturing condition display region RG4 are displayed in the same time series. A time unit of time series according to the present embodiment is a manufacturing month in which the molded product is molded. The time unit of the time series may be any time unit, for example, a manufacturing time or a manufacturing date. Further, for example, the time unit of the time series displayed on the display screen SC may be changed by a predetermined operation such as a click.

In the example of FIG. 2, a period from January 2020 to October 2020 corresponds to the maintenance period. In the period, a time point at which maintenance in January 2020 is completed corresponds to the first time point, and a time point at which maintenance in October 2020 is started corresponds to the second time point. The maintenance in October 2020 is maintenance executed after the maintenance in January 2020. The molding mold is not maintained after November 2020. Periods corresponding to two or more maintenance periods may be displayed on the display screen SC.

In the example of FIG. 2, pieces of information in a period other than the period corresponding to the maintenance period are displayed. More specifically, on the display screen SC shown in FIG. 2, pieces of information in a period after the time point at which the maintenance in October 2020 is completed are displayed. The period is a period after the time point at which the maintenance is finally executed. Hereinafter, the period may be referred to as a current period. In another embodiment, for example, a period other than the period corresponding to the maintenance period may not be displayed on the display screen SC.

In the present embodiment, in the cumulative number of shots display region RG1, the cumulative number of shots is displayed by a scatter diagram in time series. In the example of FIG. 2, among shots in October 2020, a shot up to a time point at which maintenance in October is started is counted as a shot in the maintenance period. Further, among the shots in October 2020, a shot after a time point at which the maintenance in October is completed is counted as a shot in a current period. Therefore, in the example of FIG. 2, both the number of shots in the maintenance period and the cumulative number of shots in the current period are displayed in October 2020.

In the cumulative number of shots display region RG1, the number of shots per month counted for each manufacturing month is displayed by a bar graph in time series. In another embodiment, the cumulative number of shots may be displayed by, for example, a bar graph or a line graph on the display screen SC. Further, the number of shots per month may be displayed by, for example, a scatter diagram or a line graph. Further, the number of shots per month may not be displayed in the cumulative number of shots display region RG1.

In the present embodiment, in the physical quantity information display region RG2, each physical quantity included in the physical quantity information is displayed in time series for each physical quantity. More specifically, a cushion amount, a cavity temperature, a management dimension representing a dimension of the molded product, and a weight of the molded product are displayed in the physical quantity information display region RG2. In the example of FIG. 2, the management dimension, the weight of the molded product, the cushion amount, and a temperature of the metal mold are displayed in this order from the top, but the display order of these physical quantities may be any display order. Further, the display order of these physical quantities may be interchanged by a predetermined operation such as drag-and-drop.

As shown in FIG. 2, in the present embodiment, the physical quantities displayed in the physical quantity information display region RG2 are respectively represented by boxplots. Each boxplot displayed in the physical quantity information display region RG2 indicates a maximum value, a minimum value, an average value, and a quartile of each physical quantity for each month. That is, in the present embodiment, each physical quantity displayed in the physical quantity information display region RG2 is represented by a statistic.

As shown in FIG. 2, in the present embodiment, the boxplot of each physical quantity is displayed at a position corresponding to a frame GL displayed for each physical quantity. More specifically, an upper side TS of each frame GL indicates a first value of each physical quantity, and a lower side BS of each frame GL indicates a second value of each physical quantity. The first value is a value larger than the second value. For example, when the first value is an upper limit value of a management limit and the second value is a lower limit value of the management limit, the upper side TS corresponds to an upper management limit line and the lower side BS corresponds to a lower management limit line. Accordingly, in the physical quantity information display region RG2, it is possible to easily visually recognize whether each physical quantity in each month is within the management limits. Similarly, for example, the upper side TS and the lower side BS may represent the upper limit standard value and the lower limit standard value of a physical quantity, respectively.

The cushion amount, among the physical quantities displayed in the physical quantity information display region RG2, is represented by a position of a tip end portion of the injection plunger or the in-line screw provided in the injection device when a plasticized material is injected into the molding mold. That is, the cushion amount is a physical quantity related to the injection device among the physical quantities included in the first physical quantity described above, and more specifically, is a physical quantity related to a position of the injection plunger or the in-line screw. Further, since the cushion amount is used, for example, as an index for determining whether pressure maintaining is appropriately performed, the cushion amount is also a physical quantity related to the pressure maintaining. In another embodiment, the first physical quantity may include, for example, an injection pressure, a pressure maintaining force, a temperature of the injection device, a speed of the injection plunger, and a torque value of a motor for driving the injection plunger as physical quantities related to the injection device, and these physical quantities may be displayed in the physical quantity information display region RG2.

As described above, the first physical quantity may include, for example, physical quantities related to the material storage part, physical quantities related to the plasticizing device, and physical quantities related to the mold clamping device, and these physical quantities may be displayed in the physical quantity information display region RG2. The physical quantities related to the material storage part include, for example, a temperature and a humidity in the material storage part. The physical quantities related to the plasticizing device include, for example, a temperature of a heater for heating a material in the plasticizing device, and a temperature and a flow rate of a cooling medium such as cooling water that circulates in the plasticizing device. The physical quantities related to the mold clamping device include, for example, a driving speed of the mold clamping device, a mold-clamping force, and a torque value of a motor for driving the mold clamping device. The first physical quantity may include physical quantities related to a part in the injection molding machine 100 other than the material storage part, the plasticizing device, the injection device, and the mold clamping device.

The cavity temperature is a physical quantity related to the cavity among the physical quantities included in the second physical quantity described above. For example, the cavity temperature may be directly measured by a temperature sensor for measuring a temperature in the cavity, or may be calculated based on a temperature of an outer surface of the metal mold or the like. In another embodiment, the second physical quantity may include, for example, a humidity in the cavity, a pressure in the cavity, a dimension of the cavity, and a pressure in the gas vent communicating with the cavity as physical quantities related to the cavity, and these physical quantities may be displayed in the physical quantity information display region RG2.

As described above, the second physical quantity may include, for example, physical quantities related to the movable part and physical quantities related to the temperature adjustment part, and these physical quantities may be displayed in the physical quantity information display region RG2. The physical quantities related to the movable part include, for example, a displacement amount of an ejector pin provided in the molding mold, and an operation speed of the ejector pin. The physical quantities of the temperature adjustment part include, for example, a temperature of a heater for heating the molding mold, and a temperature and a flow rate of a cooling medium such as cooling water that circulates in the molding mold. In another embodiment, the second physical quantity may include, for example, a flow rate and a weight of lubricating oil supplied to the molding mold.

The management dimension and a weight of the molded product are included in the third physical quantity described above. In another embodiment, the third physical quantity may include, for example, a surface area and a volume of the molded product in addition to or instead of the management dimension and the weight of the molded product, and these physical quantities may be displayed in the physical quantity information display region RG2.

In the present embodiment, the first physical quantity, the second physical quantity, and the third physical quantity are color-coded and displayed in the physical quantity information display region RG2. More specifically, in the physical quantity information display region RG2, a box portion of the boxplot representing the management dimension that is the third physical quantity, and similarly a box portion of the boxplot representing the weight of the molded product that is the third physical quantity are colored in gray. Similarly, a box portion of the boxplot representing the cushion amount is colored in orange, and a box portion of the boxplot representing the temperature of the metal mold is colored in blue. In another embodiment, for example, each physical quantity may be color-coded according to a difference in lightness or saturation instead of color. Further, for example, the frame GL may be color-coded. Further, for example, a physical quantity based on the measurement data and a physical quantity based on the command value may be color-coded and displayed. Further, the physical quantities may not be color-coded and displayed on the display screen SC, and may be displayed in the same color.

In the present embodiment, in the environmental information display region RG3, the environmental humidity included in the environmental information is displayed in time series. In the present embodiment, the environmental humidity is displayed by a scatter diagram. As described above, the environmental temperature may be included in the environmental information, and the environmental temperature may be displayed in the environmental information display region RG3. Further, in another embodiment, the environmental temperature and the environmental humidity may be displayed by, for example, a line graph, a bar graph, or a boxplot.

In the manufacturing condition display region RG4, as information on the manufacturing condition of the molded product, OH information indicating a time point at which overhaul is performed, OH person-in-charge information indicating a person-in-charge of the overhaul, and device information indicating the identification information of the injection molding machine 100 on which the molding mold is mounted are displayed in this order from the top. The OH information indicates the time point at which the overhaul of the molding mold is performed by a change in color. In the present embodiment, the time point at which the overhaul is performed is synonymous with the maintenance time point. Further, regarding the person-in-charge information and the device information, each person-in-charge is displayed in a different color and each injection molding machine 100 is displayed in a different color, so that each person-in-charge and each injection molding machine 100 are distinguishably displayed. In the maintenance period displayed on the display screen SC of FIG. 2, only the identification information of a single injection molding machine 100 is displayed as the device information. However, for example, when the molding mold is mounted on a different injection molding machine 100 for each manufacturing month in the maintenance period, identification information corresponding to each injection molding machine 100 is displayed as the device information for each manufacturing month. In the present embodiment, the person-in-charge information indicates each person-in-charge with a different number, so that each person-in-charge is distinguishably displayed. Further, the device information indicates each injection molding machine 100 with a different alphabet, so that each injection molding machine 100 is distinguishably displayed.

On the display screen SC, information in any period may be scroll-displayed by, for example, a scroll bar operation (not shown). Further, for example, when there are many types of physical quantities displayed in the physical quantity information display region RG2, any physical quantity in the physical quantity information display region RG2 may be scroll-displayed on the display screen SC.

According to the first embodiment described above, the display unit 450 displays the cumulative number of shots of the molding mold in the maintenance period and the physical quantity information in the same time series. The maintenance period is a period from the first time point representing the maintenance time point to the second time point representing the maintenance time point after the first time point. Accordingly, by referring to the display screen SC, it is possible to grasp a relationship between the cumulative number of shots and the physical quantities included in the physical quantity information for each maintenance period of the molding mold. Therefore, it is possible to determine whether a timing of maintenance executed in the past is appropriate based on the relationship between the cumulative number of shots and the physical quantities of the molding mold. Therefore, there is a high possibility that the timing of the maintenance of the molding mold can be appropriately determined.

For example, in the example of FIG. 2, third quartiles of the weight of the molded product and the cushion amount in September 2020 exceed the first values represented by the upper sides TS of the frames GL. The cumulative number of shots in August 2020 that is one month before September 2020 is about 50,000. In this case, it can be determined that next maintenance is to be executed before the current number of shots counted from the last executed maintenance time point reaches about 50,000 shots. More specifically, for example, a timing at which the next maintenance is executed is determined to be a timing at which the current number of shots reaches about 50,000 shots that is the cumulative number of shots at a time point in August 2020. When the number of shots for each manufacturing date is the same, a date on which the current number of shots reaches about 50,000 shots can be predicted, and executing maintenance on that date can also be determined in advance. In this way, when the timing of the maintenance of the molding mold is appropriately determined and the maintenance of the molding mold is executed at an appropriate timing, life of the molding mold can be further extended, and deterioration in quality of the molded product can be reduced.

According to the present embodiment, on the display screen SC displayed on the display unit 450, the cumulative number of shots, the physical quantity information, and the environmental information including at least either one of the environmental temperature and the environmental humidity is displayed in the same time series. Accordingly, by referring to the display screen SC, the relationship between the cumulative number of shots and the physical quantities included in the physical quantity information can be grasped in consideration of an influence of the environmental temperature and the environmental humidity on the physical quantities. Therefore, there is a higher possibility that the timing of the maintenance of the molding mold can be appropriately determined.

According to the present embodiment, the second time point is the maintenance time point next to the first time point. Therefore, by referring to the display screen SC, the relationship between the cumulative number of shots during each maintenance and the physical quantities included in the physical quantity information can be grasped, so that there is a higher possibility that the timing of the maintenance of the molding mold can be appropriately determined.

According to the present embodiment, the notification unit 530 that notifies the maintenance information of the molding mold when a physical quantity included in the current physical quantity information is out of the predetermined range is provided. Therefore, the user can execute the maintenance of the molding mold based on the maintenance information notified by the notification unit 530.

According to the present embodiment, the physical quantity included in the physical quantity information is represented by the statistic on the display screen SC. Therefore, for example, as compared with a case where the physical quantities that are not statistically processed are displayed on the display screen SC as they are, a display space can be saved.

B. Another Embodiment (B1) In the above-described embodiment, the physical quantity information includes all of the first physical quantity, the second physical quantity, and the third physical quantity. Meanwhile, the physical quantity information may include at least any one of the first physical quantity, the second physical quantity, and the third physical quantity.

(B2) In the above-described embodiment, the environmental information is displayed on the display screen SC. Meanwhile, the environmental information may not be displayed on the display screen SC. Further, in this case, the physical quantity acquisition unit 520 may not acquire the environmental information.

(B3) In the above-described embodiment, the second time point is the maintenance time point next to the first time point. Meanwhile, the second time point may not be the maintenance time point next to the first time point. For example, one or more other maintenance time points may be present between the first time point and the second time point.

(B4) In the above-described embodiment, the notification unit 530 is provided. Meanwhile, the notification unit 530 may not be provided.

(B5) In the above-described embodiment, the physical quantity included in the physical quantity information is represented by the boxplot on the display screen SC. Meanwhile, the physical quantity included in the physical quantity information may not be represented by the boxplot on the display screen SC. For example, the physical quantity included in the physical quantity information may be represented by a scatter diagram, a line graph, or a bar graph in which values such as a maximum value, a minimum value, and an average value for each period such as a manufacturing month or a manufacturing date are plotted. Further, a part or all of the physical quantities displayed on the display screen SC may be physical quantities that are not statistically processed.

(B6) In the above-described embodiment, the number-of-shots counting unit 510 counts the cumulative number of shots in the maintenance period. However, for example, the first control unit 110 of the injection molding machine 100 may count the cumulative number of shots and transmit the counted cumulative number of shots to the management device 500. In this case, the first control unit 110 may count the cumulative number of shots based on, for example, the shot number of the molding mold and the information on the maintenance time point input to the injection molding machine 100.

(B7) In the above-described embodiment, the maintenance of the molding mold may not be a so-called overhaul. For example, the maintenance of the molding mold may be washing or cleaning of the molding mold performed without disassembling the molding mold, or may be maintenance of replacing only a part of parts that constitute the molding mold such as an insert or an ejector pin.

(B8) In the above-described embodiment, the information on the manufacturing condition of the molded product is displayed on the display screen SC, but the information on the manufacturing condition of the molded product may not be displayed.

(B9) In the above-described embodiment, each physical quantity displayed in the physical quantity information display region RG2 is displayed by one boxplot for each month. Meanwhile, for example, as physical quantities in a month in which maintenance is executed, such as October 2020 in the example of FIG. 2, physical quantities in a period before the maintenance in October and physical quantities in a period after the maintenance in October may be individually displayed by boxplots or the like. Further, as physical quantities in a month in which maintenance is executed, for example, only physical quantities in a period before the maintenance in the month may be displayed by a boxplot or the like. For example, even if a time unit of time series is a manufacturing date, a manufacturing time, or the like, as physical quantities on a date or a time when maintenance is executed, physical quantities in a period before the maintenance within the date or the time and physical quantities in a period after the maintenance may be individually displayed, or only physical quantities in the period before the maintenance within the date or the time may be displayed. Further, a case where the number of shots counted for each time unit, such as the number of shots per month described above, is displayed in the cumulative number of shots display region RG1 is similar to that described above, for example, as the number of shots per month in a month in which maintenance is executed, the number of shots in a period before the maintenance within the month and the number of shots in a period after the maintenance may be individually displayed, or only the number of shots in the month in the period before the maintenance within the month may be displayed.

C. Other Aspects

The present disclosure is not limited to the embodiments described above, and can be implemented in various forms without departing from the spirit of the present disclosure. For example, the present disclosure can also be implemented by the following aspects. In order to solve a part or all of problems of the present disclosure, or to achieve a part or all of effects of the present disclosure, technical features of the above-described embodiments corresponding to technical features in the following aspects can be replaced or combined as appropriate. Further, technical features can be deleted as appropriate unless the technical features are described as essential in the present specification.

(1) According to an aspect of the present disclosure, an injection molding machine management system that manages an injection molding machine that molds a molded product by injection molding is provided. The injection molding machine management system includes: a physical quantity acquisition unit configured to acquire physical quantity information including at least any one of a first physical quantity representing a physical quantity related to the injection molding of the injection molding machine, a second physical quantity representing a physical quantity related to the injection molding of a molding mold mounted on the injection molding machine, and a third physical quantity representing a physical quantity related to quality of the molded product; a storage unit configured to store a cumulative number of shots of the molding mold in a predetermined maintenance period and the physical quantity information in time series; and a display unit configured to display a display screen on which the cumulative number of shots and a physical quantity included in the physical quantity information are displayed in the same time series. The maintenance period is a period from a first time point at which the molding mold is maintained to a second time point at which the molding mold is maintained after the first time point.

According to such an aspect, by referring to the display screen, it is possible to grasp a relationship between the cumulative number of shots and the physical quantity included in the physical quantity information for each maintenance period of the molding mold. Therefore, it is possible to determine for the molding mold that whether a timing of maintenance executed in the past is appropriate based on the relationship between the cumulative number of shots and the physical quantity. Therefore, there is a high possibility that the timing of the maintenance of the molding mold can be appropriately determined.

(2) In the above-described aspect, the physical quantity information may include the first physical quantity, and the first physical quantity may include at least any one of a physical quantity of a material storage part configured to store a material used for the injection molding, a physical quantity of a plasticizing device configured to plasticize the material, a physical quantity of an injection device configured to inject the plasticized material into the molding mold, and a physical quantity of a mold clamping device configured to clamp the molding mold.

(3) In the above-described aspect, the physical quantity information may include the second physical quantity, and the second physical quantity may include at least any one of a physical quantity of a cavity, a physical quantity of a movable part provided in the molding mold, and a physical quantity of a temperature adjustment part provided in the molding mold.

(4) In the above-described aspect, the physical quantity acquisition unit may acquire environmental information including at least any one of an environmental temperature and an environmental humidity of the injection molding machine, the storage unit may store the environmental information in time series, and the cumulative number of shots, the physical quantity information, and the environmental information may be displayed in the same time series on the display screen. According to such an aspect, by referring to the display screen, it is possible to grasp the relationship between the cumulative number of shots and the physical quantity included in the physical quantity information in consideration of an influence of the environmental temperature and the environmental humidity on the physical quantity. Therefore, there is a higher possibility that the timing of the maintenance of the molding mold can be appropriately determined.

(5) In the above-described aspect, the second time point may be a time point which is next to the first time point and at which the molding mold is maintained. According to such an aspect, by referring to the display screen, it is possible to grasp the relationship between the cumulative number of shots during each maintenance and the physical quantity included in the physical quantity information, so that there is a higher possibility that the timing of the maintenance of the molding mold can be appropriately determined.

(6) In the above-described aspect, the injection molding machine management system may further include a notification unit configured to notify information on maintenance of the molding mold when a physical quantity included in the current physical quantity information is out of a predetermined range. According to such an aspect, it is possible to execute the maintenance of the molding mold based on the maintenance information notified by the notification unit.

(7) In the above-described aspect, a physical quantity included in the physical quantity information may be represented by a statistic on the display screen. According to such an aspect, as compared with a case where the physical quantities that are not statistically processed are displayed on the display screen as they are, a display space can be saved.

What is claimed is:

1. An injection molding machine management system comprising:
   an injection molding machine configured to inject a plasticized material into a mold to form a molded product;
   a take-out robot configured to take the molded product from the injection molding machine and remove a sprue and a runner from the molded product;
   an inspection device configured to receive the molded product from the take-out device and inspect the molded product with respect to measuring a dimension and a weight of the molded product to determine whether a type of defect of the molded product occurs;
   a memory configured to store a program and a predetermined maintenance period of time for the mold; and
   a processor configured to execute the program to control the injection molding machine management system by communicating with the injection molding machine, the take-out device, and the inspection device so as to:
      receive, from the injection molding machine, physical information including identification information of the mold and the injection molding machine, a shot number of injection molding with respect to the mold, an injection filling time with respect to the mold, an injection pressure, a mold clamping force, and a set temperature of each part of the injection molding machine;
      receive, from the inspection device, an inspection result including the measured dimension and weight and the type of defect of the molded product;
      display the received physical information and the inspection result on a display as a time-series graph format for a period of time corresponding to two or more maintenance periods, wherein the display is divided into a plurality of display areas including:
         a top display area in which the shot number of injection molding with respect to the mold is displayed;
         an intermediate display area in which the dimension and the weight of the molded product, a cushion amount, and a cavity temperature are displayed; and
         a bottom display area in which maintenance information and the identification information of the injection molding machine and an environmental humidity are displayed; and
      notify an operator of a necessity of maintenance based on:
         the predetermined maintenance period of time;
         the received physical information; and/or
         the inspection result.

2. The injection molding machine management system according to claim 1, wherein
   the physical information includes a first physical quantity for the injection molding machine, and
   the first physical quantity includes at least any one of a physical quantity related to a material storage part configured to store a material used for the injection molding, a physical quantity related to a plasticizing device configured to plasticize the material to form the plasticized material, a physical quantity related to an injection device configured to inject the plasticized material into the mold, and a physical quantity related to a mold clamping device configured to clamp the mold.

3. The injection molding machine management system according to claim 1, wherein
   the physical information includes a second physical quantity for the mold, and
   the second physical quantity includes at least any one of a physical quantity related to a cavity, a physical quantity related to a movable part provided in the mold, and a physical quantity related to a temperature adjustment part provided in the mold.

4. The injection molding machine management system according to claim 1, wherein
   the processor is further configured to receive environmental information including at least any one of an environmental temperature and the environmental humidity of the injection molding machine,
   the memory is further configured to store the environmental information in time series, and
   the processor is further configured to display a cumulative shot number and the environmental information in the same time series on the display.

5. The injection molding machine management system according to claim 1, wherein
   the processor is configured to receive the physical information during a period of time starting at a first maintenance time of the mold and ending at a subsequent maintenance time of the mold.

6. The injection molding machine management system according to claim 1, wherein
   the processor is configured to notify the operator of the necessity of maintenance when the processor determines that a physical quantity included in the received physical information is out of a predetermined range.

7. The injection molding machine management system according to claim 1, wherein
   the processor is configured to display the received physical information as a statistic on the display.

* * * * *